(12) United States Patent
Mantovano

(10) Patent No.: US 12,467,564 B2
(45) Date of Patent: Nov. 11, 2025

(54) THREADED CONNECTION FOR HAMMERING INTERCONNECTED TUBULAR MEMBERS

(71) Applicant: Tenaris Connections B.V., Campana (AR)

(72) Inventor: Luciano Omar Mantovano, Campana (AR)

(73) Assignee: TENARIS CONNECTIONS B.V., Campana (AR)

( * ) Notice: Subject to any disclaimer, the term of this patent is extended or adjusted under 35 U.S.C. 154(b) by 0 days.

(21) Appl. No.: 17/594,700

(22) PCT Filed: Apr. 30, 2020

(86) PCT No.: PCT/EP2020/062093
§ 371 (c)(1),
(2) Date: Oct. 26, 2021

(87) PCT Pub. No.: WO2020/221886
PCT Pub. Date: Nov. 5, 2020

(65) Prior Publication Data
US 2022/0235884 A1 Jul. 28, 2022

(30) Foreign Application Priority Data
Apr. 30, 2019 (NL) .................................... 2023042

(51) Int. Cl.
*F16L 15/00* (2006.01)
*E21B 17/042* (2006.01)
*F16L 15/06* (2006.01)

(52) U.S. Cl.
CPC .......... *F16L 15/003* (2013.01); *E21B 17/042* (2013.01); *F16L 15/06* (2013.01)

(58) Field of Classification Search
CPC ....... E21B 17/042; F16L 15/003; F16L 15/06; F16L 15/001
See application file for complete search history.

(56) References Cited

U.S. PATENT DOCUMENTS

| | | | | |
|---|---|---|---|---|
| 3,047,316 A | * | 7/1962 | Wehring | F16L 15/003 285/349 |
| 3,508,771 A | * | 4/1970 | Duret | E21B 17/042 285/334 |
| 4,429,904 A | * | 2/1984 | Reimert | F16L 15/003 285/27 |

(Continued)

OTHER PUBLICATIONS

PCT International Search Report and Written Opinion in International Appln. No. PCT/EP2020/062093, dated Jul. 10, 2020, 14 pages.

*Primary Examiner* — David Bochna
(74) *Attorney, Agent, or Firm* — Morgan, Lewis & Bockius LLP

(57) ABSTRACT

A threaded connection for hammering interconnected tubular members into a ground, such as onshore land or offshore seabed, for exploration and production of a hydrocarbon well, said threaded connection comprising a pin member comprising an external shoulder, a pin nose and a tapered pin threaded portion located between the external shoulder and the pin nose, and a box member comprising an internal shoulder, a box nose and a tapered box threaded portion located between the internal shoulder and the box nose.

35 Claims, 17 Drawing Sheets

(56) References Cited

U.S. PATENT DOCUMENTS

| | | | | |
|---|---|---|---|---|
| 4,601,491 A * | 7/1986 | Bell, Jr. | ............... | F16L 15/003 |
| | | | | 285/24 |
| 4,610,467 A * | 9/1986 | Reimert | ............... | E21B 17/042 |
| | | | | 285/27 |
| 4,707,001 A * | 11/1987 | Johnson | ............... | F16L 15/003 |
| | | | | 285/332.3 |
| 4,822,081 A | 4/1989 | Blose et al. | | |
| 5,066,052 A * | 11/1991 | Read | ................ | E21B 17/042 |
| | | | | 285/334 |
| 5,505,502 A * | 4/1996 | Smith | .................. | F16L 15/003 |
| | | | | 285/334 |
| 9,714,731 B2 * | 7/2017 | O'Dell | ................. | E21B 17/043 |
| 2004/0130152 A1 | 7/2004 | Delange et al. | | |
| 2014/0183862 A1 * | 7/2014 | Angelle | ............... | F16L 15/06 |
| | | | | 29/890.14 |
| 2014/0262213 A1 * | 9/2014 | Delange | .............. | F16L 15/003 |
| | | | | 285/333 |
| 2015/0145247 A1 * | 5/2015 | Zhu | ..................... | E21B 17/042 |
| | | | | 285/333 |
| 2017/0328139 A1 * | 11/2017 | Wade | ................. | E21B 17/042 |
| 2023/0037968 A1 * | 2/2023 | Gupta | ................ | E21B 17/042 |

* cited by examiner

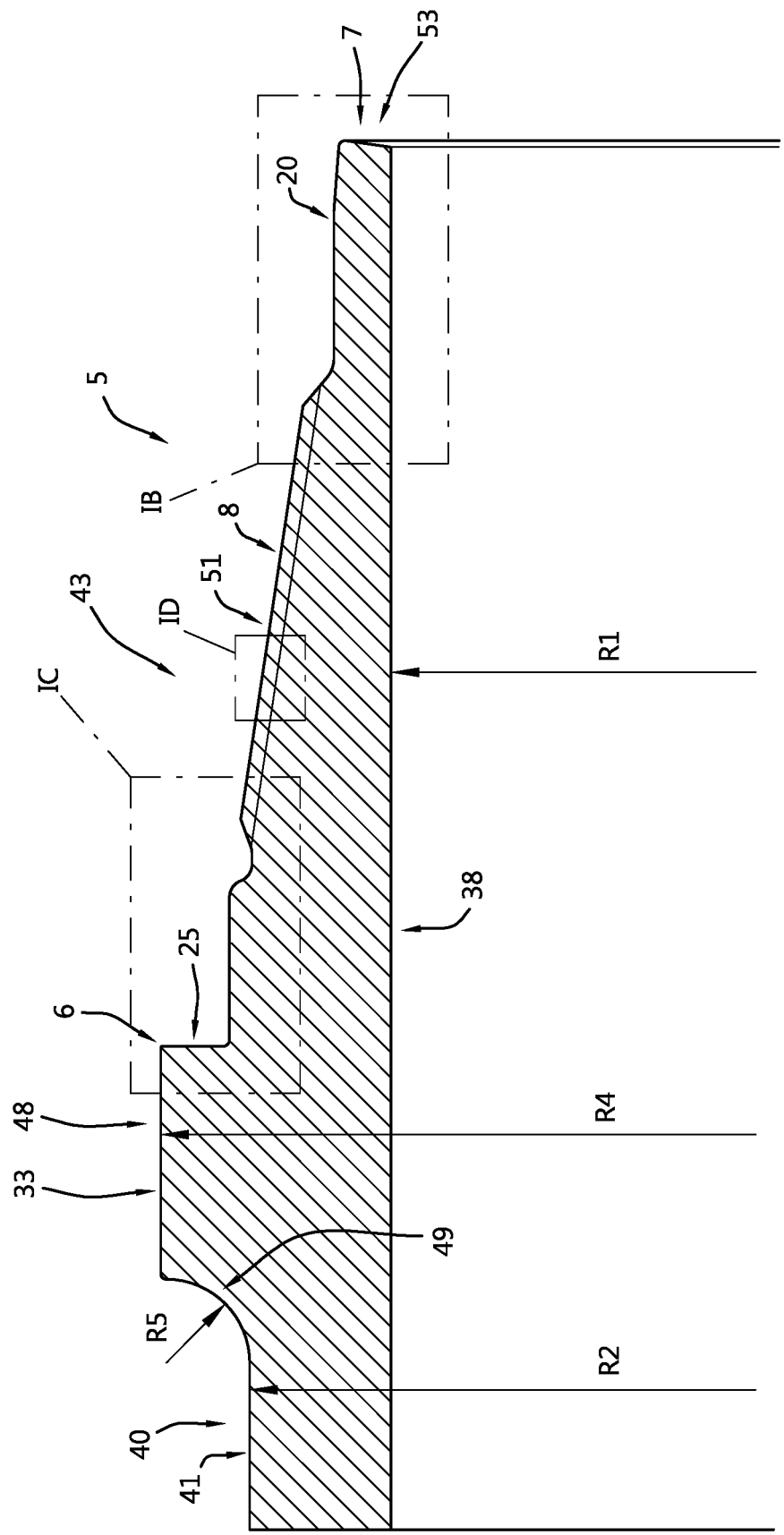

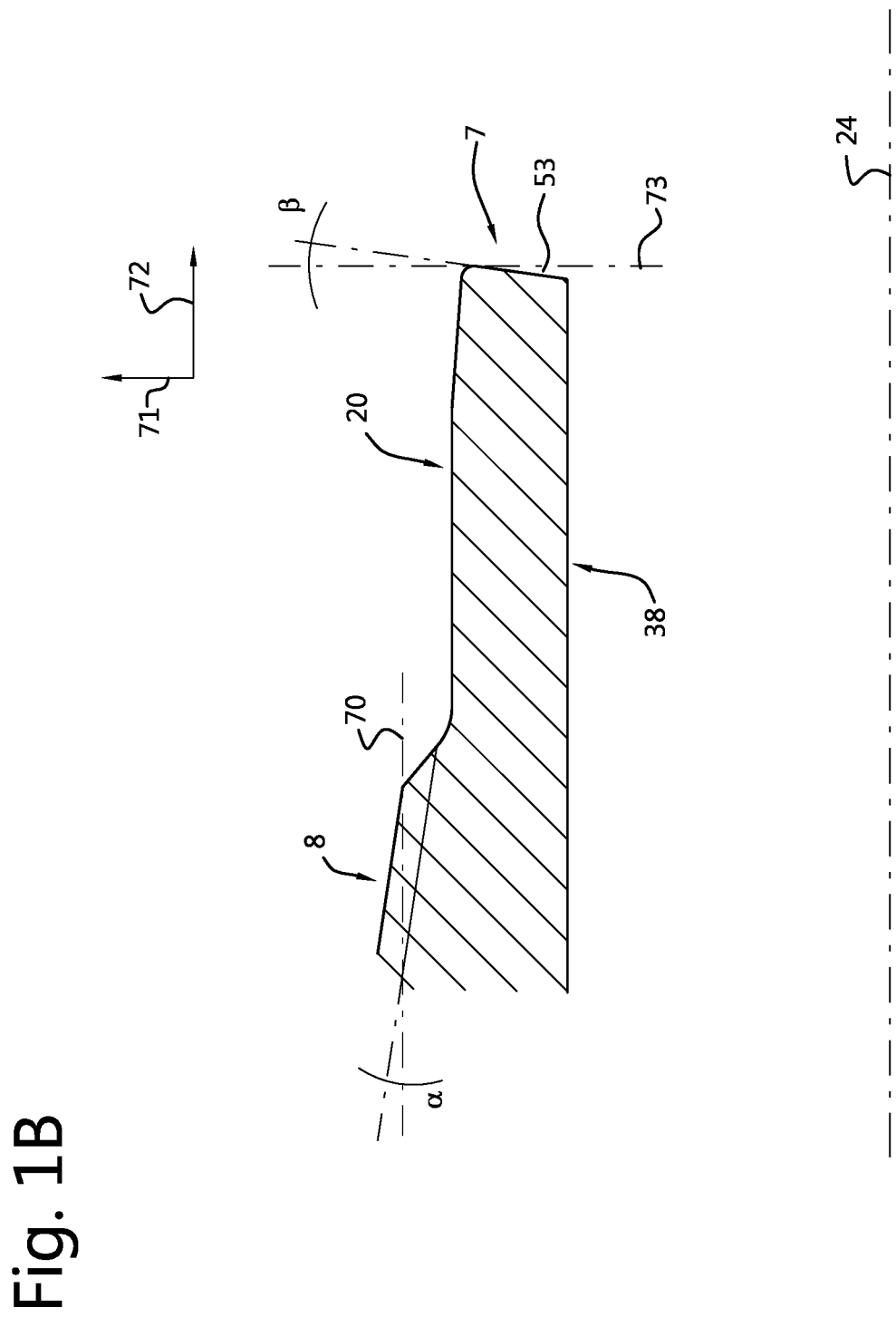

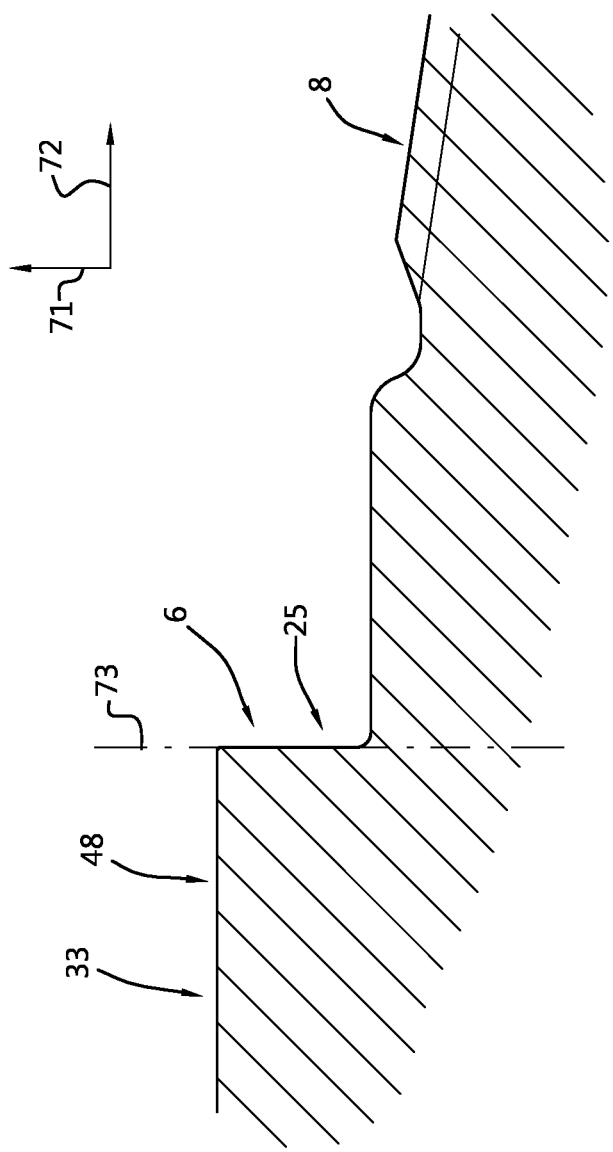

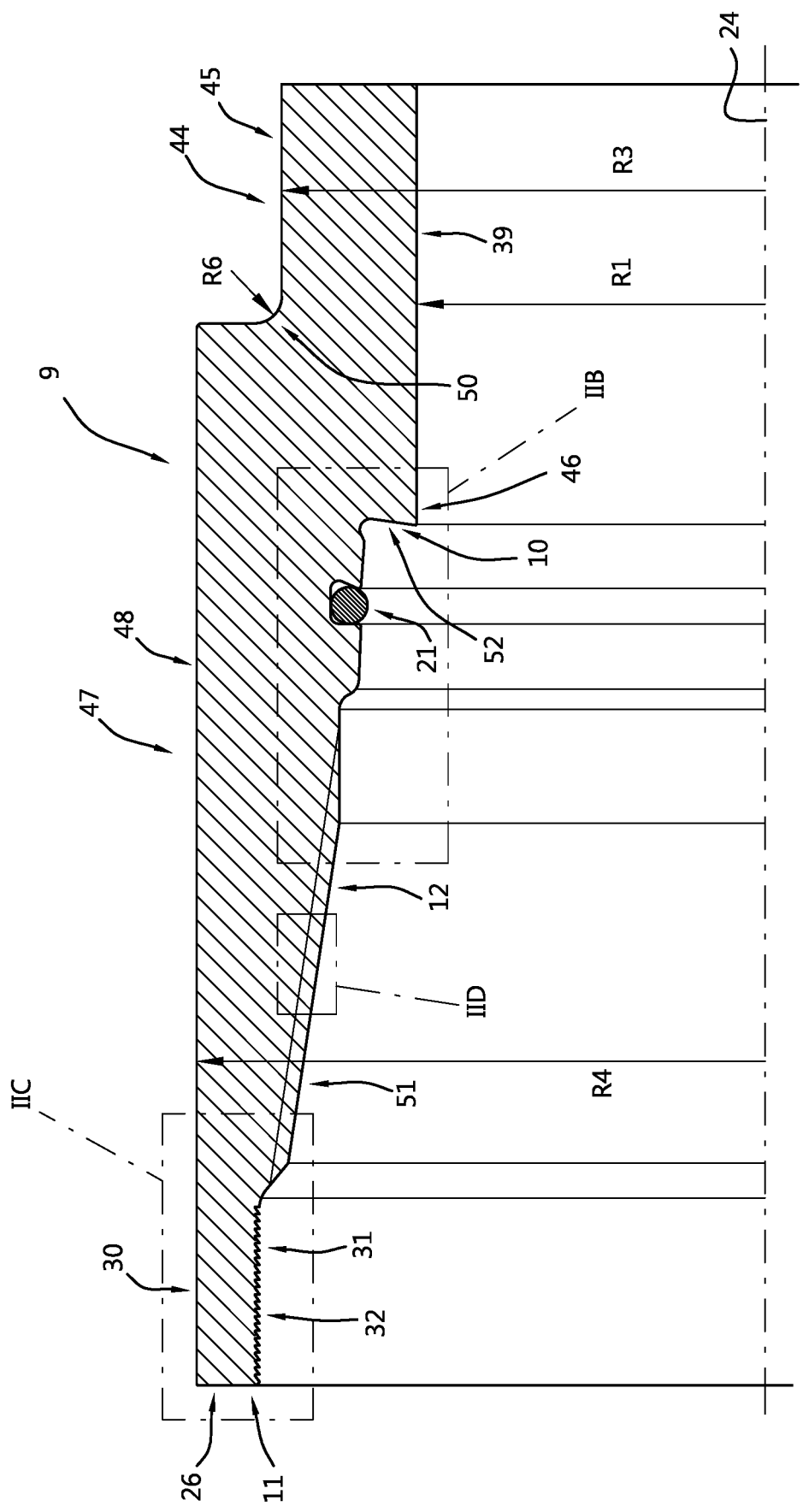

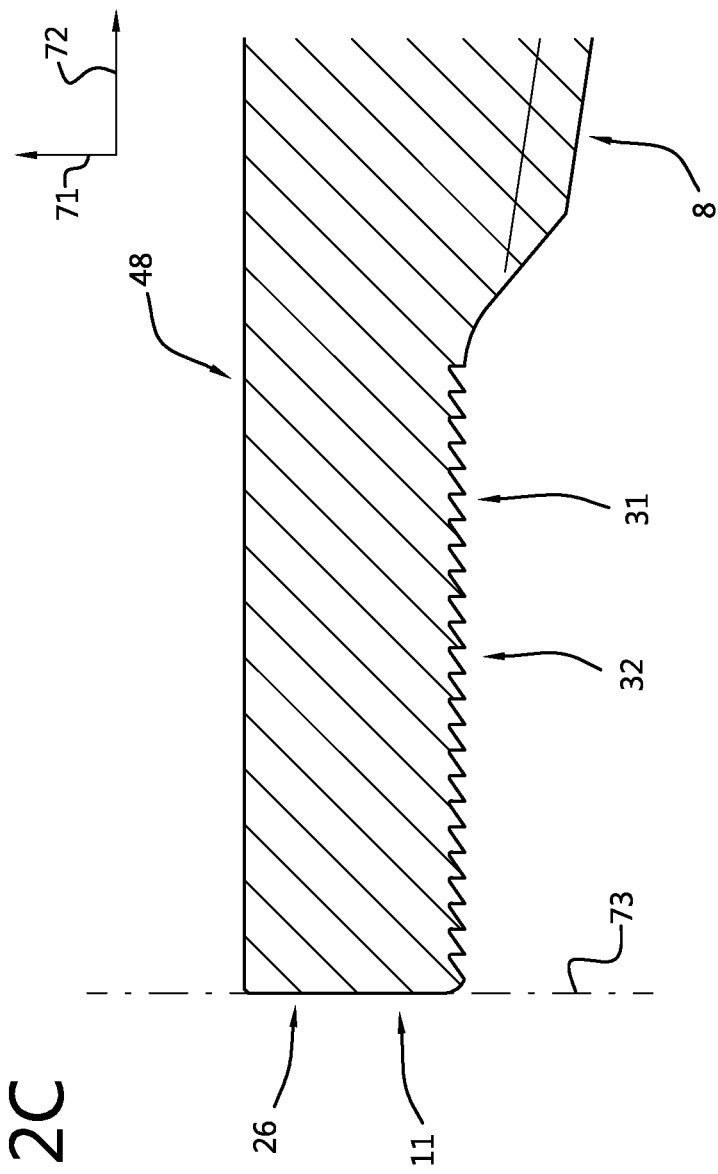

THREADED CONNECTION FOR HAMMERING INTERCONNECTED TUBULAR MEMBERS

CROSS-REFERENCE TO RELATED APPLICATION(S)

This application is a U.S. National Phase Application under 35 U.S.C. § 371 and claims the benefit of priority to International Application Serial No. PCT/EP2020/062093, filed Apr. 30, 2020, which claims priority to The Netherlands Application Serial No. NL2023042, filed Apr. 30, 2019, the entire contents of which are hereby incorporated by reference.

FIELD OF THE INVENTION

The invention relates to a threaded connection for hammering interconnected tubular members into a ground for exploration and production of a hydrocarbon well. The ground may be any type of ground such as onshore land or offshore seabed. The invention also relates to a method for hammering said interconnected tubular members in the ground for exploration and production of a hydrocarbon well.

BACKGROUND OF THE INVENTION

Hammering is used onshore and offshore to drive a string of interconnected tubular members into a ground. A drive chaser is placed on top of the string tubular members to apply hammering impact forces to the string. This is a time efficient and therefore relatively cheap way to drive the string of tubular members into the ground.

SUMMARY OF THE INVENTION

The known threaded connections for hammering interconnected tubular members into the ground for exploration and production of a hydrocarbon have the disadvantage that they may not obtain or maintain the required sealing characteristics or get damaged. Said known threaded connections may have the disadvantage that it is not possible or difficult or time consuming to determine if the required degree of sealing has been achieved during make-up. Said known threaded connections may have the disadvantage that the degree of sealing is negatively affected by the hammering or that the threaded connection is damaged by the hammering such that its general performance is impaired.

BRIEF DESCRIPTION OF THE INVENTION

The invention has the objective to provide an improved, or at least alternative, a threaded connection for hammering interconnected tubular members in a ground for exploration and production of a hydrocarbon well. Said threaded connection comprises;
a pin member comprising an external shoulder, a pin nose and a tapered pin threaded portion located between the external shoulder and the pin nose,
a box member comprising an internal shoulder, a box nose and a tapered box threaded portion located between the internal shoulder and the box nose, wherein
the pin threaded portion and the box threaded portion are configured to engage each other during rotational make-up of the threaded connection,
the pin threaded portion and the box threaded portion comprise hooked threads providing radial interference between crests of the pin threaded portion and roots of the box threaded portion and/or between crests of the box threaded portion and roots of the pin threaded portion at final make-up of the threaded connection,
facing load flanks of the hooked threads of the pin threaded portion and the box threaded portion are in contact with each other at final make-up of the threaded connection,
facing stab flanks of the hooked threads of the pin threaded portion and the box threaded portion are located at a flank distance from each other at final make-up of the threaded connection,
the pin member comprises a sealing surface located between the pin nose and the pin threaded portion,
the box member comprises an elastomeric sealing member located between the internal shoulder and the box threaded portion,
the sealing surface and the elastomeric sealing member are configured to form a radial seal at final make-up of the threaded connection,
the box nose is in contact with the external shoulder at final make-up of the threaded connection, and
the pin nose is located at a shoulder distance from the internal shoulder at final make-up of the threaded connection.

The threaded connection is configured to have the box nose in contact with the external shoulder at final make-up. This allows that one can determine during rotational make-up of the threaded connection when final make-up is achieved by checking if the box nose is in contact with the external shoulder. This is an effective and efficient way to determine when the final make-up of the threaded connection is reached.

For threaded connections that will be hammered it is very important that the correct configuration of final make-up is reached in order to ensure the impact forces induced by hammering are transferred along the correct path from the pin member to the box member. If the threaded connection is hammered into the ground without having the external shoulder and the box nose in contact with each other, the impact forces created during hammering would primarily be transferred from the pin member to the box member via the engaged pin and box threaded portions. This creates a high risk that the pin and box threaded portions are damaged by for example galling and plastic deformation.

In use, the tubular members which are interconnected via the threaded connection are hammered into the ground after final make-up of the threaded connection has been reached. As mentioned, this is to ensure that the impact forces induced by hammering are transferred along the correct path from the pin member to the box member. The pin member is positioned on top of the box member during the hammering. In said situation, the impact forces are primarily transferred from the pin member to the box member via the external shoulder and box nose being in contact with each other. The fact that the impact forces induced by the hammering first move through the external shoulder being in contact with the box nose provides a relevant degree of protection against the impact forces for the engaged pin and box threaded portions and the radial seal.

The effects of the impact forces on the threaded connection are further reduced by the fact that at final make-up facing stab flanks of the hooked threads of the pin threaded portion and the box threaded portion are located at a flank distance from each other at final make-up of the threaded connection and that there is radial interference between crests and roots of the pin and box threaded portions. The flank distance between stab flanks allows that the pin and box threaded portions can move over some distance relative to each other under the impact forces of the hammering. This movement between the pin and box threaded portions together with the friction forces created by the radial interference and acting against said movement forms an energy absorption buffer to absorb energy from the impact forces before facing stab flanks come in contact.

The threaded connection is configured to have the pin nose located at a shoulder distance from the internal shoulder at final make-up. This way it is avoided that the sealing effect of the radial seal formed by the sealing surface and the elastomeric member and being located between the pin nose and the engaged pin and box threaded portions is impaired by deformations of the sealing surface created by interference forces between the pin nose and the internal shoulder. In addition, the shoulder distance between the internal shoulder and the pin nose also avoids that the impact forces induced by hammering create deformations in the sealing surface of the radial seal. Furthermore, the fact the impact forces not only first move through the external shoulder being in contact with the box nose but also through the energy absorbing engaged pin and box threaded portions provides a further degree of protection against the shock waves for the radial seal.

The impact forces induced by hammering create shock waves which move through the threaded connection. A shock wave first creates compression and subsequently tension in the threaded connection. The engaged pin and box threaded portions are the only parts in the threaded connection which take up the tensile forces in the threaded connection. The hooked threads with their facing load flanks being in contact with each other at final make-up ensure that the threaded connection is able to withstand the tension created by the shock waves. In addition, the hooked threads help to maintain contact between the external shoulder and the box nose when the shock waves move through the threaded connection.

In an embodiment of the threaded connection according to the invention, the threaded connection defines a central axis. The tapered pin threaded portion is located between the external shoulder and the pin nose when seen along the central axis. The tapered box threaded portion is located between the internal shoulder and the box nose when seen along the central axis. The sealing surface is located between the pin nose and the pin threaded portion when seen along the central axis. The elastomeric sealing member is located between the internal shoulder and the box threaded portion when seen along the central axis. The term "between" is in this document in several situations used in a similar manner to indicate that it relates to the situation when seen along the central axis.

In an embodiment of the threaded connection according to the invention, the external shoulder comprises an external contact surface being in contact with a box nose contact surface of the box nose at final make-up, and the external contact surface and the box nose contact surface extend perpendicular to the central axis of the threaded connection.

In an embodiment of the threaded connection according to the invention, radial interference between crests of the pin threaded portion and roots of the box threaded portion and/or between crests of the box threaded portion and roots of the pin threaded portion at final make-up of the threaded connection is between, and including, 0.05 mm and 0.25 mm.

In an embodiment of the threaded connection according to the invention, the threaded connection is configured to have the pin nose and the internal shoulder in contact with each other while the facing stab flanks are not in contact with each other at final make-up and under a predetermined compressive force working on the threaded connection in a direction of the central axis.

In an embodiment of the threaded connection according to the invention, the facing stab flanks are more spaced from each other than the pin nose and internal shoulder when seen along the central axis.

In an embodiment of the threaded connection according to the invention, the shoulder distance is larger than 0 mm and smaller than 0.3 mm at final make-up of the threaded connection. Preferably, the shoulder distance is larger than 0 mm and smaller than 0.24 mm at final make-up of the threaded connection. The shoulder distance is measured in axial direction along the central axis.

In an embodiment of the threaded connection according to the invention, the flank distance is between, and including, 0.1 mm and 0.25 mm at final make-up of the threaded connection. The flank distance is measured in axial direction along the central axis.

In an embodiment of the threaded connection according to the invention, the threaded connection comprises at least one anti-rotational key and at least one key slot configured to receive the anti-rotational key in a locking position in which at least part of the anti-rotational key extends between the pin member and the box member to prevent rotational movement of the pin member and the box member relative to each other at final make-up of the threaded connection.

In an embodiment of the threaded connection according to the invention;
the box member comprises a box lip section extending from the box nose towards the box threaded portion and comprising a box lip inner surface provided with box ribs extending around the central axis,
the pin member comprises a pin member shoulder section which forms the external shoulder,
the at least one anti-rotational key comprise a key body section and a key cutting section,
in the locking position, the key body section is located in the key slot and the key cutting section is located between the box inner lip surface and the pin member, and
the key cutting section is provided with cutting edges for cutting through the box ribs in a cutting direction transverse, preferably perpendicular, to the box ribs during the placing of the respective key in the locking position.

In an embodiment of the threaded connection according to the invention, the threaded connection is at final make-up free from any radial seal provided between the external shoulder and the engaged pin threaded portion and box threaded portion.

In an embodiment of the threaded connection according to the invention, the pin member comprises a pin member inner surface, the box member comprises a box member inner surface, and the pin member inner surface and the box member inner surface extend flush to each other at final make-up of the threaded connection.

In an embodiment of the threaded connection according to the invention, the pin member inner surface and the box member inner surface are both located at an inner member surface radius R1 from the central axis.

In an embodiment of the threaded connection according to the invention;

the pin member comprises a pin pipe part having a pin pipe part outer surface located at a pin pipe part outer surface radius R2 from the central axis, the pin member comprises a pin member shoulder section which forms the external shoulder and is located between the pin pipe part and the pin threaded portion, the pin member comprise a pin connector part extending from the pin member shoulder section until the pin nose, the box member comprises a box pipe part having a box pipe part outer surface located at a box pipe part outer surface radius R3 from the central axis, the box member comprises a box member shoulder section which forms the internal shoulder and is located between the box pipe part and the box threaded portion, the box member comprise a box connector part extending from the box member shoulder section until the box nose, at final make-up, the pin connector part and the box connector part define together an outer connector surface located at an outer connector radius R4 from the central axis, and the outer connector radius R4 is larger than each of the pin pipe part outer surface radius R2 and the box pipe part outer surface radius R3.

In an embodiment of the threaded connection according to the invention, the outer connector radius R4 is between, and including, R2+13 mm and R2+19 mm.

In an embodiment of the threaded connection according to the invention, the outer connector radius R4 is between, and including, R3+13 mm and R3+19 mm.

In an embodiment of the threaded connection according to the invention, the pin pipe part outer surface radius R2 is equal to the box pipe part outer surface radius R3.

In an embodiment of the threaded connection according to the invention;

a pin transition area having a pin transition radius R5 is located between the pin pipe part outer surface and the outer connector surface, a box transition area having a box transition radius R6 is located between the box pipe part outer surface and the outer connector surface, and the pin transition radius R5 is larger than the box transition radius R6.

In an embodiment of the threaded connection according to the invention, the pin transition radius R5 is between, and including, 2 times and 5 times than the box transition radius R6.

In an embodiment of the threaded connection according to the invention, the pin transition radius R5 is between, and including, 10 mm and 20 mm and the box transition radius R6 is between, and including, 2 mm and 8 mm.

In an embodiment of the threaded connection according to the invention, the pin member and the box member comprise a single step thread formed by the pin threaded portion and box threaded portion, respectively.

In an embodiment of the threaded connection according to the invention, the pin and box threaded portions extend under a taper angle α between, and including, 6° and 11° relative to the central axis.

In an embodiment of the threaded connection according to the invention, the pin threaded portion and the box threaded portion comprise multi threads which are configured to be made-up by rotational make-up over between, and including, 180° and 360°.

In an embodiment of the threaded connection according to the invention, the internal shoulder comprises an internal stop surface facing a pin nose stop surface of the pin nose and located at the shoulder distance at final make-up, and the internal stop surface and the pin nose stop surface extend under a stop angle β of between, and including, 6° and 10° relative to a virtual perpendicular line extending perpendicular to the central axis of the threaded connection.

In an embodiment of the threaded connection according to the invention, the threaded connection is configured to reach final make-up when contact between the box nose and the external shoulder is achieved during rotational make-up.

In an embodiment of the threaded connection according to the invention, the threaded connection is configured to be hammered into the ground after final make-up has been reached and with the pin member positioned on top of the box member during the hammering.

In an embodiment of the threaded connection according to the invention, the pin member comprises a pin pipe part having a pin pipe part outer surface located at a pin pipe part outer surface radius R2 from the central axis and 2×R2 is between, and including, 508 mm and 1016 mm (between, and including, 20 inch and 40 inch).

In an embodiment of the threaded connection according to the invention, the box member comprises a box pipe part having a box pipe part outer surface located at a box pipe part outer surface radius R3 from the central axis and 2×R3 is between, and including, 508 mm and 1016 mm (between, and including, 20 inch and 40 inch).

In an embodiment of the threaded connection according to the invention, the threaded connection is configured to interconnect tubular members having an outer diameter between, and including, 508 mm and 1016 mm (between, and including, 20 inch and 40 inch).

The invention further relates to a method for hammering interconnected tubular members into a ground, such as onshore land or offshore seabed, for exploration and production of a hydrocarbon well, said tubular members being interconnected via a threaded connection according to the invention, wherein the method comprises hammering the interconnected tubular members after final make-up of the threaded connection has been reached and with the pin member positioned on top of the box member during the hammering

BRIEF DESCRIPTION OF THE DRAWINGS

Embodiments of the threaded connection and the method according to the invention will be described by way of example only, with reference to the accompanying schematic drawings in which corresponding reference symbols indicate corresponding parts, and in which.

DETAILED DESCRIPTION OF THE INVENTION

Figure 1D:
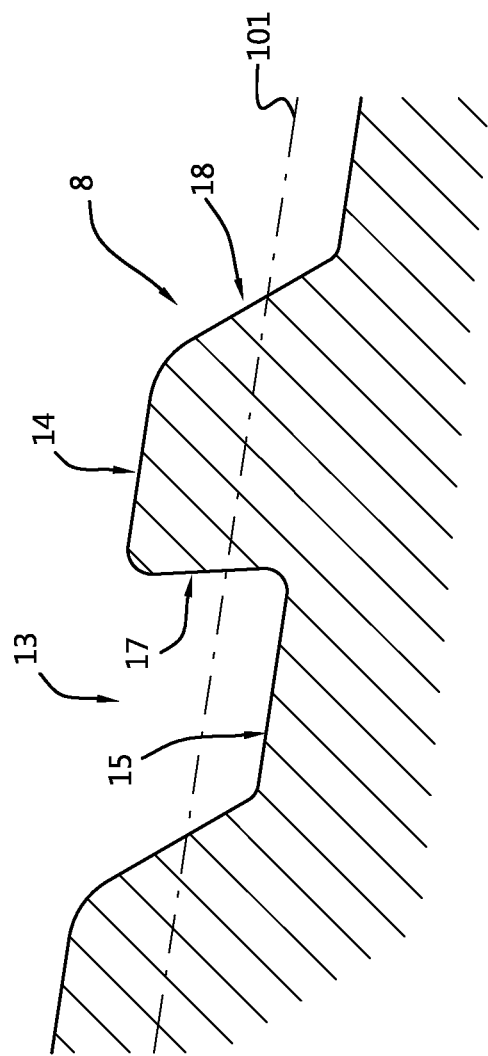
FIG. 1A schematically shows a cross sectional view of an embodiment of a pin member of a threaded connection according to the invention, FIG. 1B schematically shows an enlarged view of part of the pin threaded portion, the sealing surface and the pin nose of the pin member of FIG. 1A, FIG. 1C schematically shows an enlarged view of part of the pin threaded portion and the external shoulder of the pin member of FIG. 1A, FIG. 1D schematically shows a further enlarged view of part of the pin threaded portion of the pin member of FIG. 1A, FIG. 2A schematically shows a cross sectional view of an embodiment of a box member of a threaded connection according to the invention, FIG. 2B schematically shows an enlarged view of part of the box threaded portion, the elastomeric sealing member and the internal shoulder of the box member of FIG. 2A, FIG. 2C schematically shows an enlarged view of part of the box threaded portion, the box lip section and the box nose of the box member of FIG. 2A, FIG. 2D schematically shows a further enlarged view of part of the box threaded portion of the box member of FIG. 2A, FIG. 3A schematically shows a cross sectional view of the pin member of FIG. 1 and the box member of FIG. 2 connected to tubular members, FIG. 3B schematically shows a cross sectional view of an embodiment of the threaded connection according to the invention and comprising the pin member and the box member of FIG. 3A, FIG. 3C schematically shows an enlarged view of the engaged pin threaded portion and box threaded portion of the threaded connection of FIG. 3B, FIG. 3D schematically shows an enlarged view of the external shoulder and the box nose of the threaded connection of FIG. 3B, FIG. 3E schematically shows an enlarged view of the internal shoulder and the pin nose of the threaded connection of FIG. 3B, FIG. 3F schematically shows an alternative embodiment of the engaged pin threaded portion and box threaded portion of the threaded connection of FIG. 3B, FIG. 4A schematically show a cross sectional view perpendicular to the central axis of the pin member of FIG. 1, FIG. 4B schematically show a cross sectional view along IV-IV of FIG. 4A, FIG. 4C schematically show a view in perspective of an embodiment of an anti-rotational key of the pin member of FIG. 1, and FIG. 4D schematically show the view of FIG. 4B with the anti-rotational key of FIG. 4C located in the locking position.

An embodiment of the threaded connection 1 according to the invention is shown in the FIGS. 3A-E. Said threaded connection 1 comprises the pin member 5 shown in the FIGS. 1A-D and 4A-D and the box member 9 shown in the FIGS. 2A-D. The threaded connection 1 is configured for hammering interconnected tubular members 2 into a ground, such as onshore land or offshore seabed, for exploration and production of a hydrocarbon well.

The FIGS. 1A-D show cross sectional views of the pin member 5 of the threaded connection 1. The pin member 5 comprises an external shoulder 6, a pin nose 7 and a tapered pin threaded portion 8 located between the external shoulder 6 and the pin nose 7 when seen along the central axis 24.

The FIGS. 2A-D show cross sectional views of the box member 9 of the threaded connection 1. The box member 9 comprises an internal shoulder 10, a box nose 11 and a tapered box threaded portion 12 located between the internal shoulder 10 and the box nose 11 when seen along the central axis 24.

Figure 3A:
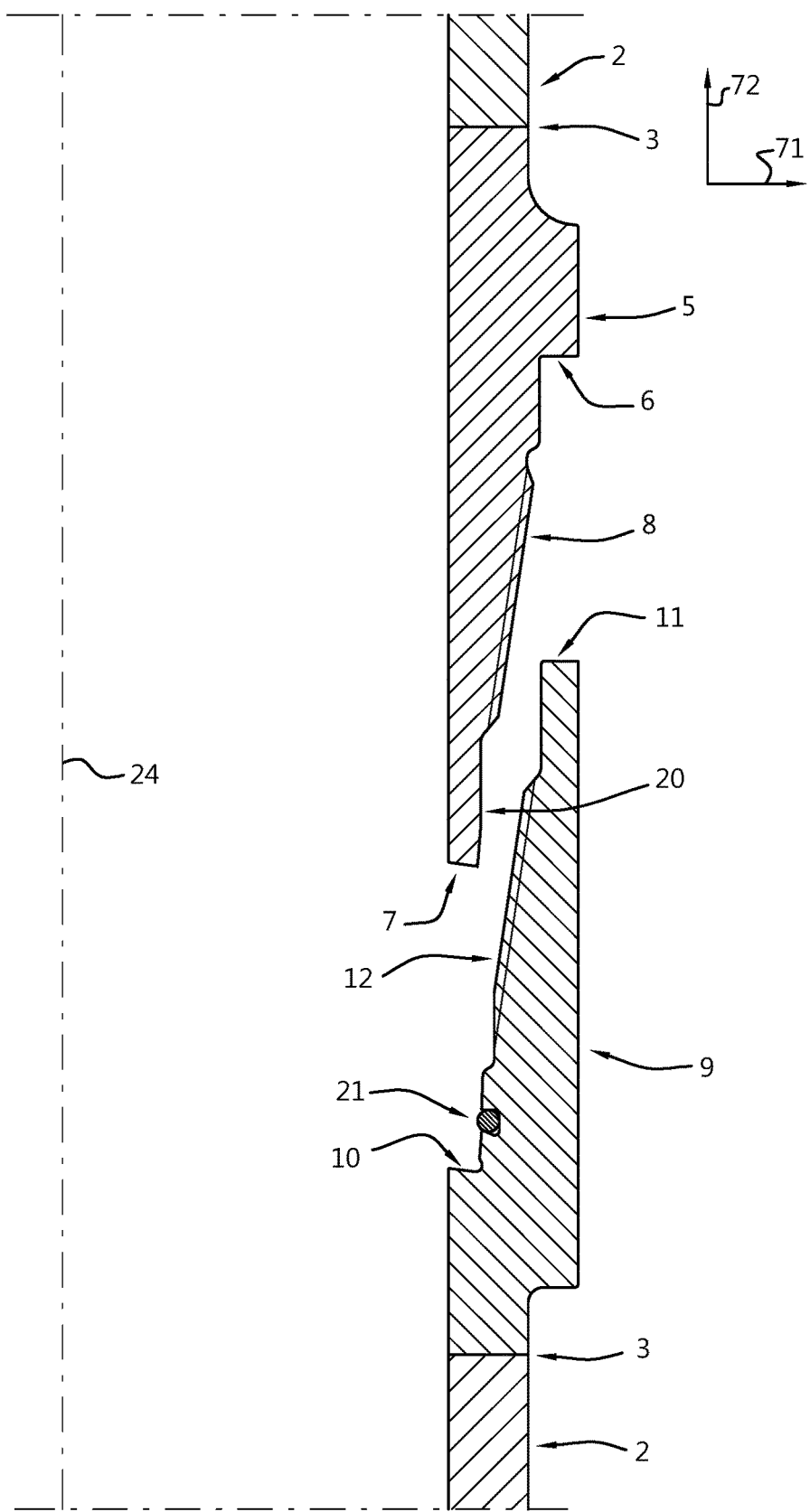
Figure 3B:
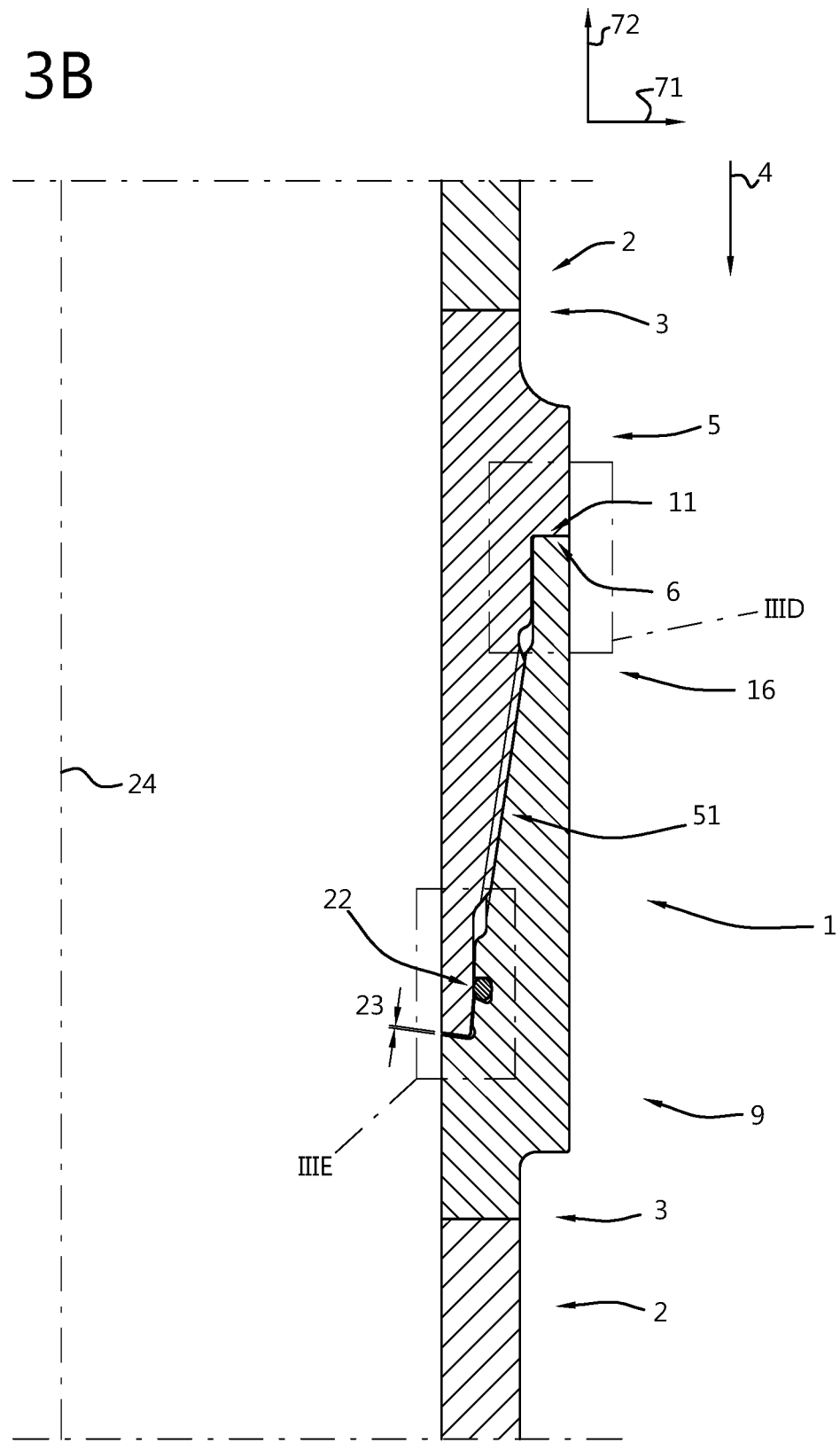
Figure 3C:
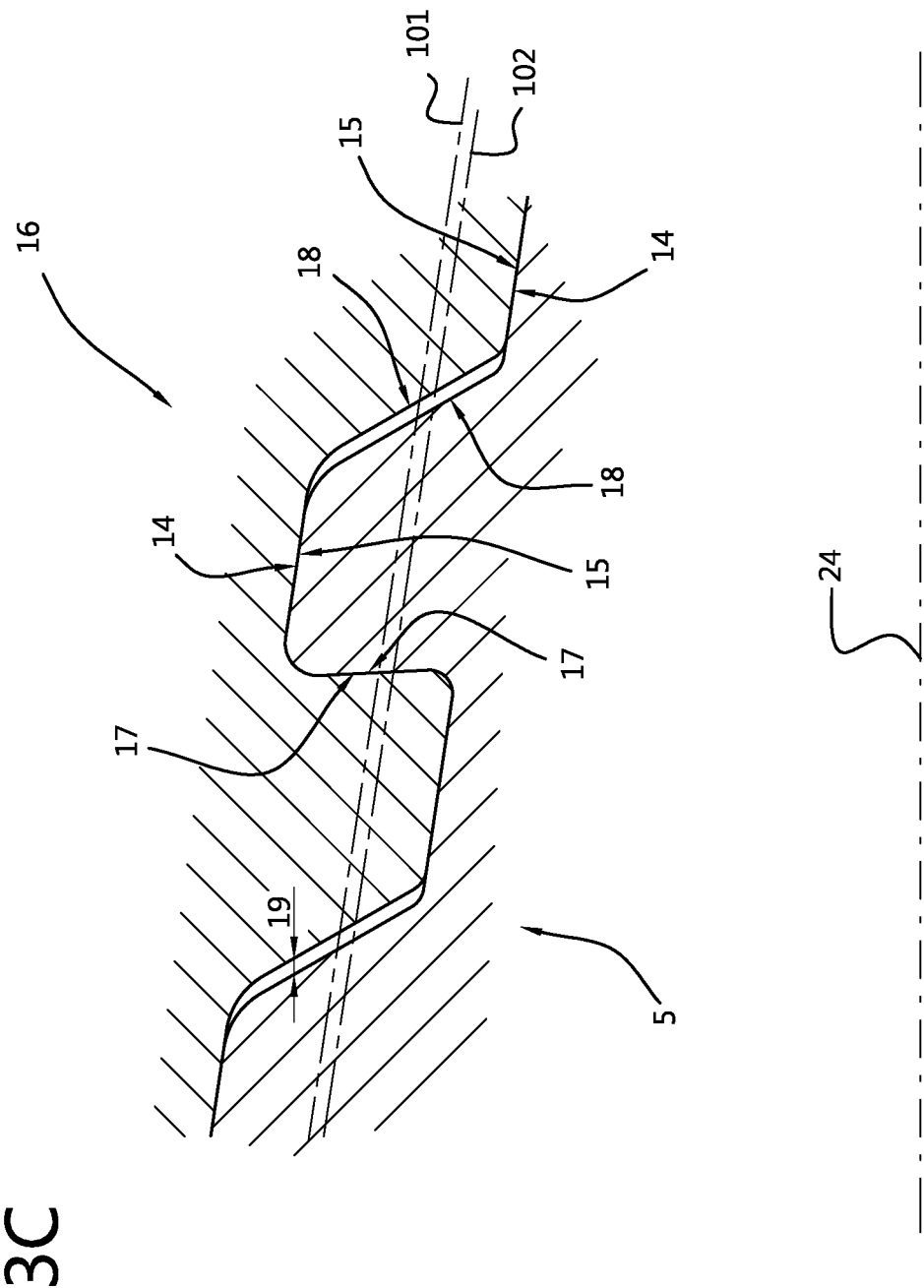
Figure 3E:
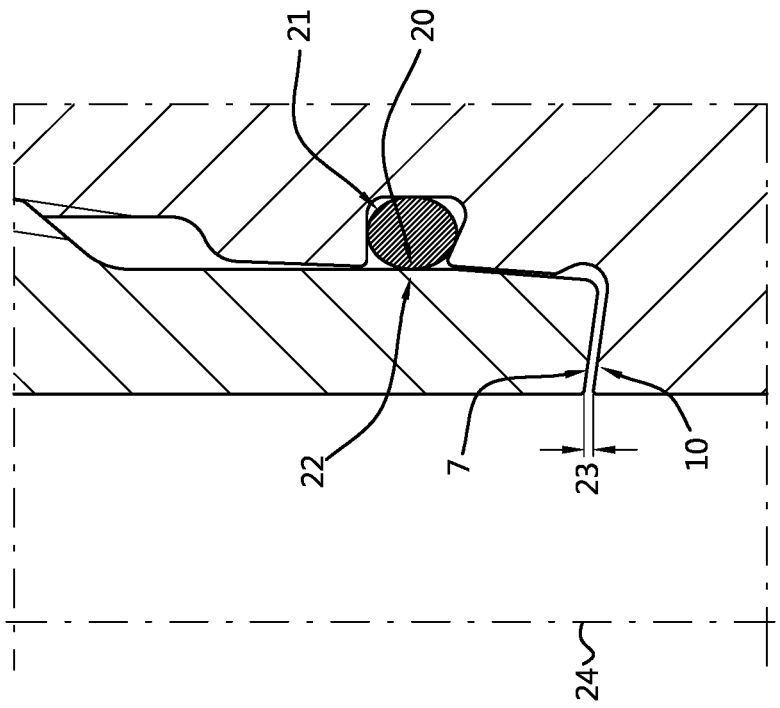

The pin threaded portion 8 and the box threaded portion 12 are configured to engage each other during rotational make-up of the threaded connection 1 (see FIG. 3B). The pin threaded portion 8 (see FIG. 1D) and the box threaded portion 12 (see FIG. 2D) comprise hooked threads 13 providing radial interference between crests 14 of the pin threaded portion 8 and roots 15 of the box threaded portion 12 and between crests 14 of the box threaded portion 12 and roots 15 of the pin threaded portion 8 at final make-up 16 of the threaded connection 1 (see FIG. 3C).

In an alternative embodiment of the threaded connection 1 according the invention, the hooked threads 13 provide at final make-up 16 radial interference only between crests 14 of the pin threaded portion 8 and roots 15 of the box threaded portion 12 or only between crests 14 of the box threaded portion 12 and roots 15 of the pin threaded portion 8. The latter alternative embodiment is shown in FIG. 3F. Said embodiment comprises a clearance between the between crests 14 of the pin threaded portion 8 and roots 15 of the box threaded portion 12.

Hooked threads 13 have a positive stab flank angle at the stab flanks 18 and a negative load flank angle at the load flanks 17. Facing load flanks 17 of the hooked threads 13 of the pin threaded portion 8 and the box threaded portion 12 are in contact with each other and facing stab flanks 18 of the hooked threads 13 of the pin threaded portion 8 and the box threaded portion 12 are located at a flank distance 19 from each other at final make-up 16 of the threaded connection 1 (see FIG. 3C).

The pin member 5 comprises a sealing surface 20 located between the pin nose 7 and the pin threaded portion 8 when seen along the central axis 24. The box member 9 comprises an elastomeric sealing member 21 located between the internal shoulder 10 and the box threaded portion 12 when seen along the central axis 24. The sealing surface 20 and the elastomeric sealing member 21 are configured to form a radial seal 22 at final make-up 16 of the threaded connection 1 (see FIG. 3C).

Figure 3D:
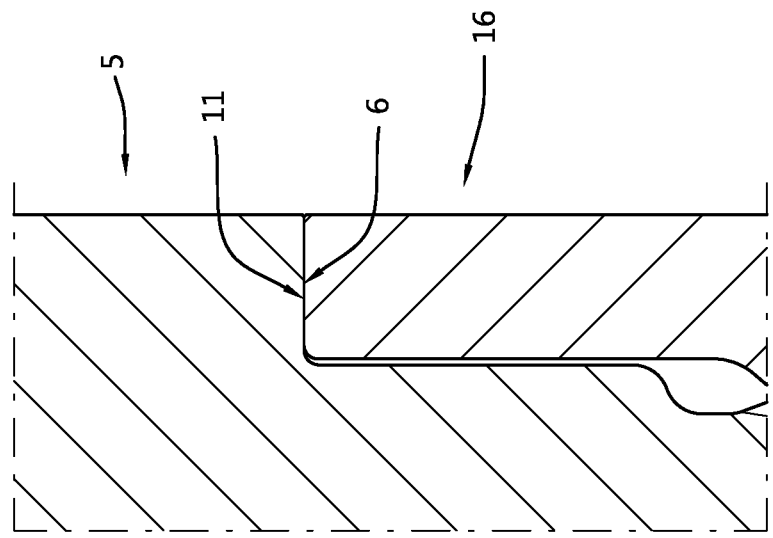
Figure 3F:
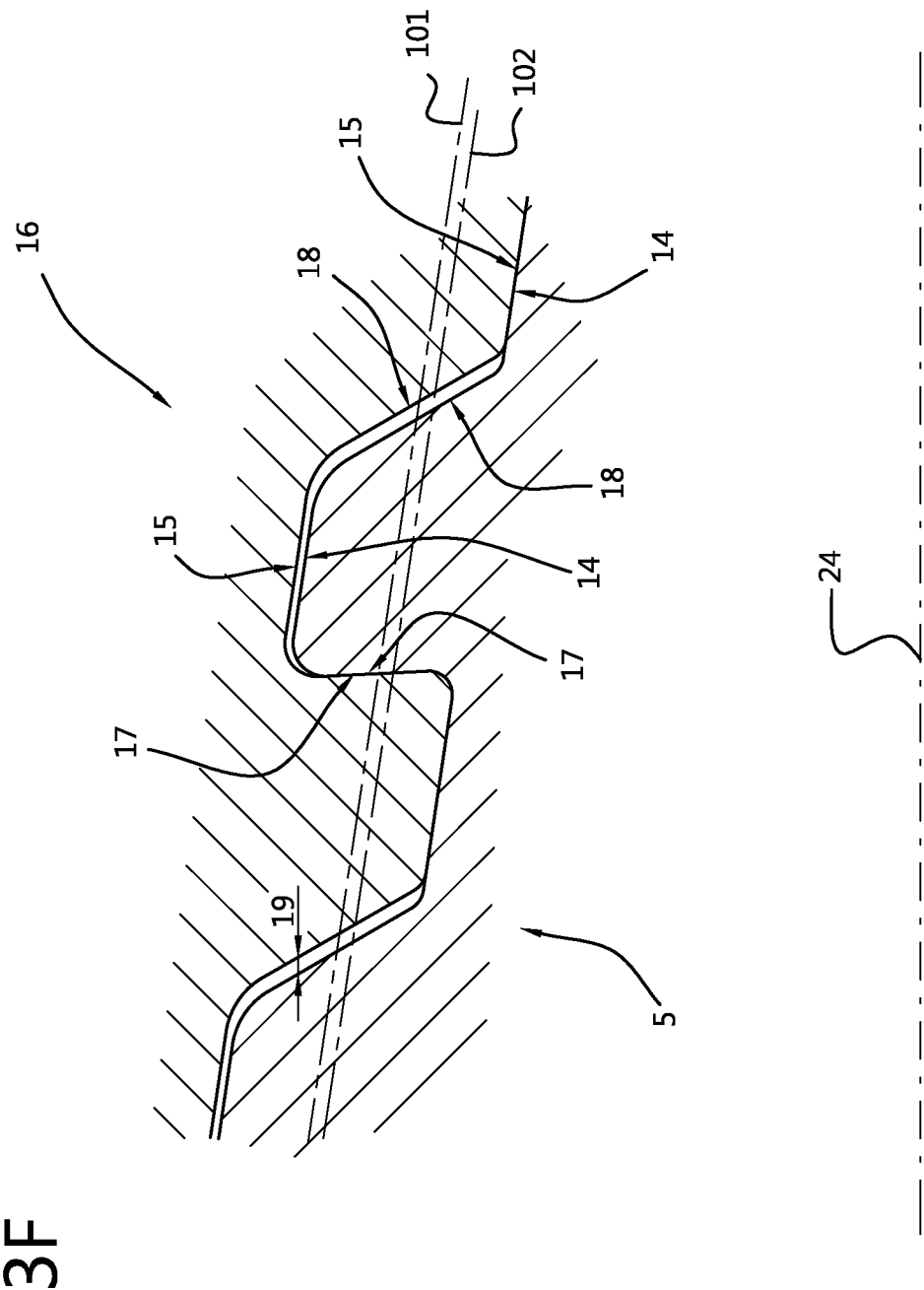

The box nose 11 is in contact with the external shoulder 6 at final make-up 16 of the threaded connection 1 (see FIG. 3D). The pin nose 7 is located at a shoulder distance 23 from the internal shoulder 10 at final make-up 16 of the threaded connection 1 (see FIG. 3E).

In FIG. 3B, the threaded connection 1 interconnects two tubular members 2 which are attached the pin member 5 and the box member 9 by welding seams 3. The horizontal direction 71 and vertical direction 72 are indicated. The threaded connection 1 is configured to be hammered into the ground after final make-up 16 has been reached and with the pin member 5 positioned on top of the box member 9 during the hammering. In said situation, the hammering will occur on the upper tubular member 2 in the direction shown by arrow 4 in FIG. 3B. The threaded connection 1 is configured to interconnect tubular members 2 having an outer diameter between, and including, 508 mm and 1016 mm (between, and including 20 inch and 40 inch).

The radial interference between crests 14 of the pin threaded portion 8 and roots 15 of the box threaded portion 12 and between crests 14 of the box threaded portion 12 and roots 15 of the pin threaded portion 8 at final make-up 16 of the threaded connection 1 is between, and including, 0.05 mm and 0.25 mm. Said radial interference improves the function as energy absorption buffer of the engaged pin and box threaded portions 8 and 12.

The threaded connection 1 is configured to have the pin nose 7 and the internal shoulder 10 in contact with each other while the facing stab flanks 18 are not in contact with each other at final make-up 16 and under a predetermined compressive force working on the threaded connection 1 in a direction of the central axis 24.

When seen along the central axis 24, the facing stab flanks 18 are more spaced from each other than the pin nose 7 and the internal shoulder 10.

This way, the pin nose 7 and the internal shoulder 10 protect the engaged pin and box threaded portions 8 and 12 against undesired high impact forces during hammering.

Tests revealed that surprisingly good results were achieved when the shoulder distance 23 is larger than 0 mm and smaller than 0.3 mm, preferably larger than 0 mm and smaller than 0.24 mm, at final make-up 16 of the threaded connection 1. These tests also indicated that surprisingly good results were achieved when the flank distance 19 is between, and including, 0.1 and 0.25 mm at final make-up 16 of the threaded connection 1. The shoulder distance 23 and the flank distance 19 are measured in axial direction along the central axis 24.

The pin member 5 comprises a pin member inner surface 38, the box member 9 comprises a box member inner surface 39, and the pin member inner surface 38 and the box member inner surface 39 extend flush to each other at final make-up 16 of the threaded connection 1 (see FIG. 3B).

The pin member inner surface 38 and the box member inner surface 39 are both located at an inner member surface radius R1 from the central axis 24 (see the FIGS. 1A and 2A). The pin member 5 comprises a pin pipe part 40 having a pin pipe part outer surface 41 located at a pin pipe part outer surface 41 radius R2 from the central axis 24. The pin member 5 comprises a pin member shoulder section 33 which forms the external shoulder 6 and is located between the pin pipe part 40 and the pin threaded portion 8. The pin member 5 comprise a pin connector part 43 extending from the pin member shoulder section 33 until the pin nose 7. 2×R2 (R2 times two) is between, and including, 508 mm and 1016 mm (between, and including, 20 inch and 40 inch).

The box member 9 comprises a box pipe part 44 having a box pipe part outer surface 45 located at a box pipe part outer surface radius R3 from the central axis 24. The box member 9 comprises a box member shoulder section 46 which forms the internal shoulder 10 and is located between the box pipe part 44 and the box threaded portion 12. The box member 9 comprise a box connector part 47 extending from the box member shoulder section 46 until the box nose 11. 2×R3 (R3 times two) is between, and including, 508 mm and 1016 mm (between, and including 20 inch and 40 inch).

At final make-up 16, the pin connector part 43 and the box connector part 47 define together an outer connector surface 48 located at an outer connector radius R4 from the central axis 24. The outer connector radius R4 is larger than each of the pin pipe part outer surface 41 radius R2 and the box pipe part outer surface radius R3.

The outer connector radius R4 is between, and including, R2+13 mm and R2+19 mm. The outer connector radius R4 is between, and including, R3+13 mm and R3+19 mm. The pin pipe part outer surface 41 radius R2 is equal to the box pipe part outer surface radius R3.

A pin transition area 49 having a pin transition radius R5 is located between the pin pipe part outer surface 41 and the outer connector surface 48. A box transition area 50 having a box transition radius R6 is located between the box pipe part outer surface 45 and the outer connector surface 48. The pin transition radius R5 is larger than the box transition radius R6. The pin transition radius R5 is preferably between, and including, 2 and 5 times larger than the box transition radius R6. The pin transition radius R5 is preferably between, and including, 10 mm and 20 mm and the box transition radius R6 is between, and including, 2 mm and 8 mm.

The pin member 5 and the box member 9 comprise a single step thread 51 formed by the pin threaded portion 8 and box threaded portion 12, respectively. This means that no further steps of threads are provided on the threaded connection 1.

Figure 2B:
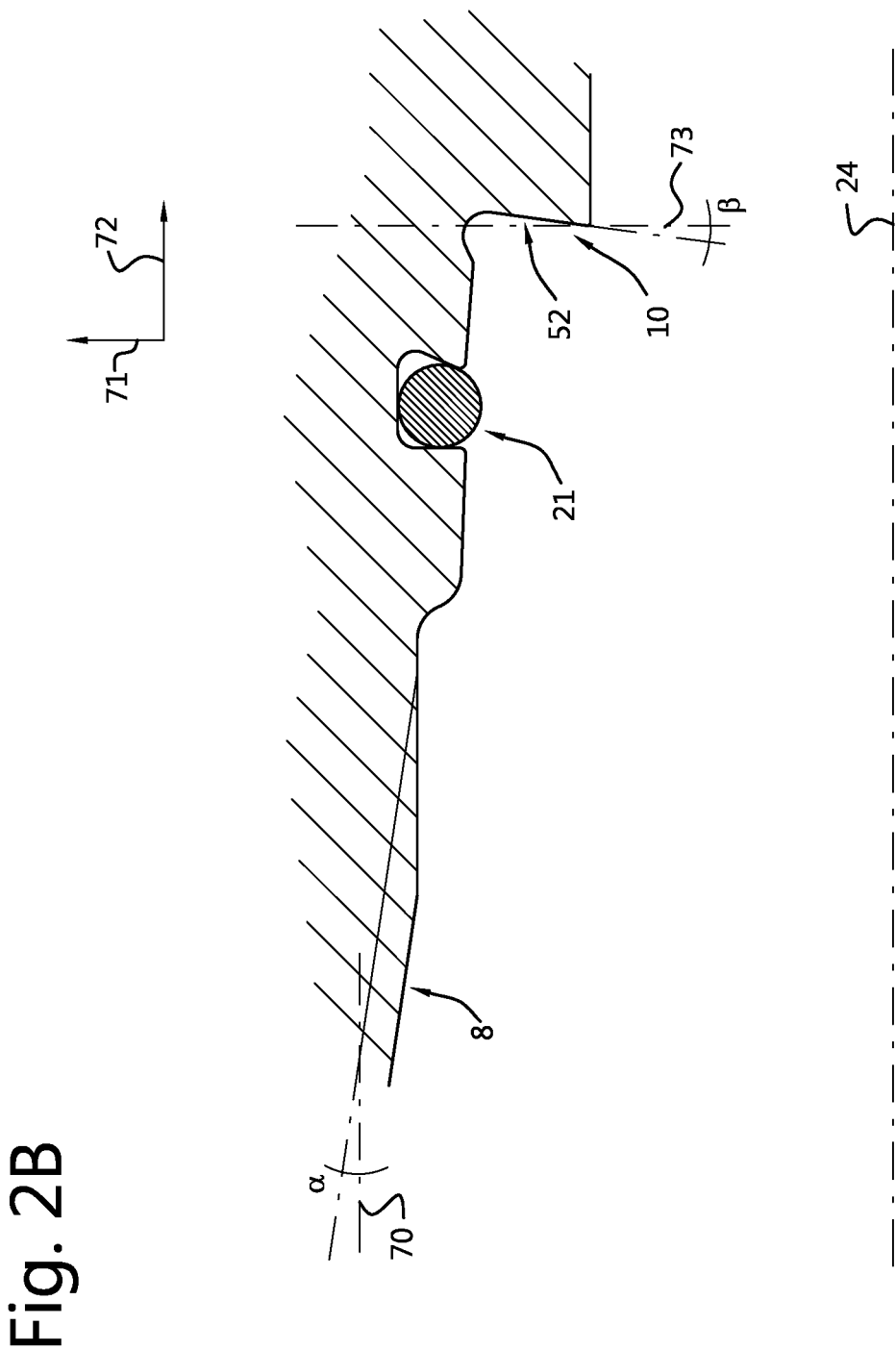
Figure 2D:
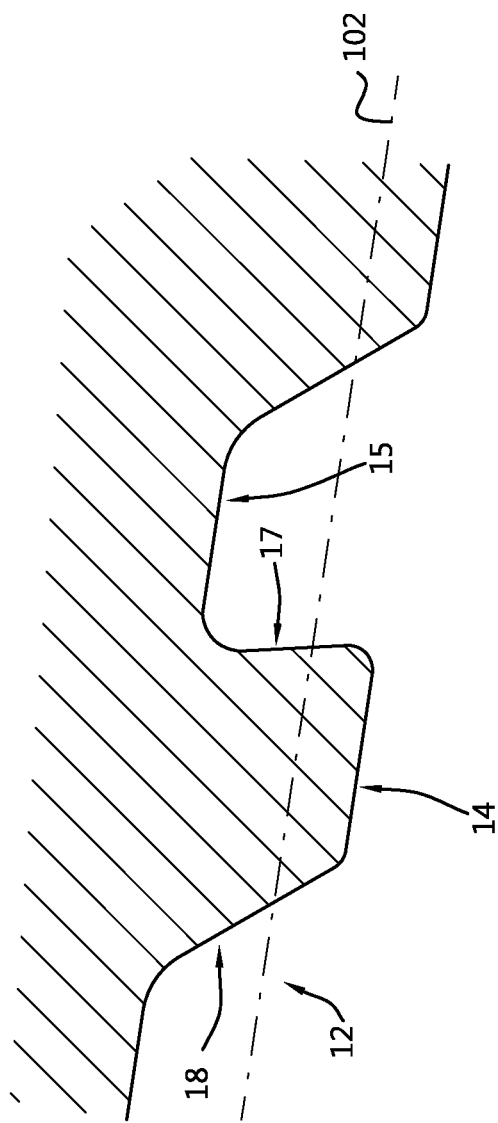

The pin and box threaded portion 8 and 12 extend preferably under a taper angle α between, and including, 6° and 11° relative to the central axis 24 (see the FIGS. 1B and 2B). The taper angle α is measured with respect to the centre line 101 of the pin threaded portion 8 and the centre line 102 of the box threaded portion 12 (see the FIGS. 1D and 2D). The taper angle α is shown relative to a virtual parallel line 70 extending parallel to the central axis 24. In the hammering position of the threaded connection 1 shown in FIG. 3B, the virtual parallel line 70 extends in the vertical direction 72.

The pin threaded portion 8 and the box threaded portion 12 comprise multi threads which are configured to be made-up by rotational make-up over between, and including, 180° and 360°.

The internal shoulder 10 comprises an internal stop surface 52 facing a pin nose stop surface 53 of the pin nose 7 and located at the shoulder distance 23 at final make-up 16, and the internal stop surface 52 and the pin nose stop surface 53 extend preferably under a stop angle β of between, and including, 4° and 12° relative to a virtual perpendicular line 73 extending perpendicular to the central axis 24 of the threaded connection 1 (see the FIGS. 1B and 2B). In the hammering position of the threaded connection 1 shown in FIG. 3B, the virtual perpendicular line 73 extends in the horizontal direction 71.

The internal stop surface 52 and the pin nose stop surface 53 are inclined away from the external shoulder 6 when seen along the virtual perpendicular line 73 in a direction away from the central axis 24.

The stop angle β of the internal stop surface 52 and the pin nose stop surface 53 ensure that the pin nose 7 tends to move towards the box member 9 instead of away.

The threaded connection 1 is at final make-up 16 free from any radial seal 22 provided between the external shoulder 6 and the engaged pin threaded portion 8 and box threaded portion 12. Such a radial seal 22 would be affected too much by the shock waves induced by the hammering and would therefore not form a reliable seal.

Figure 4A:
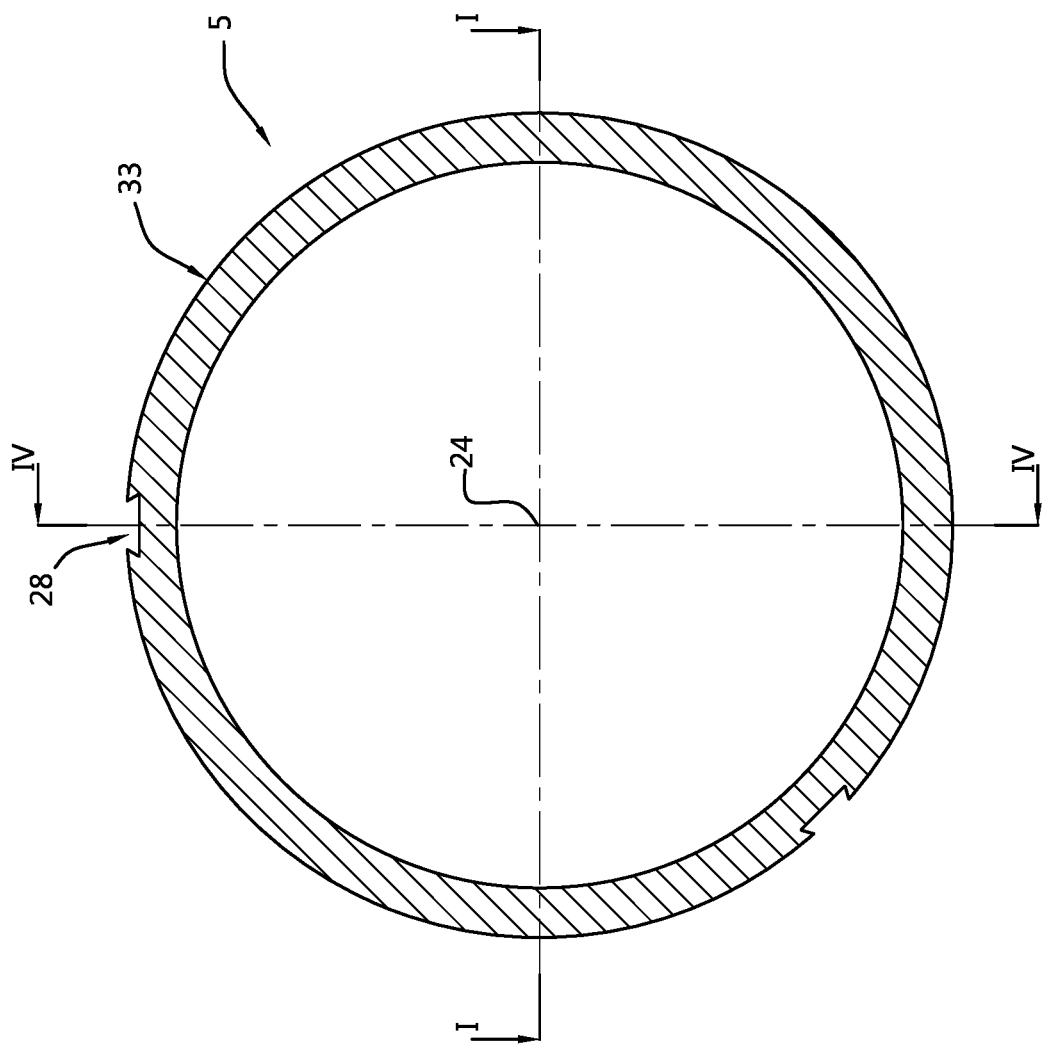
Figure 4B:
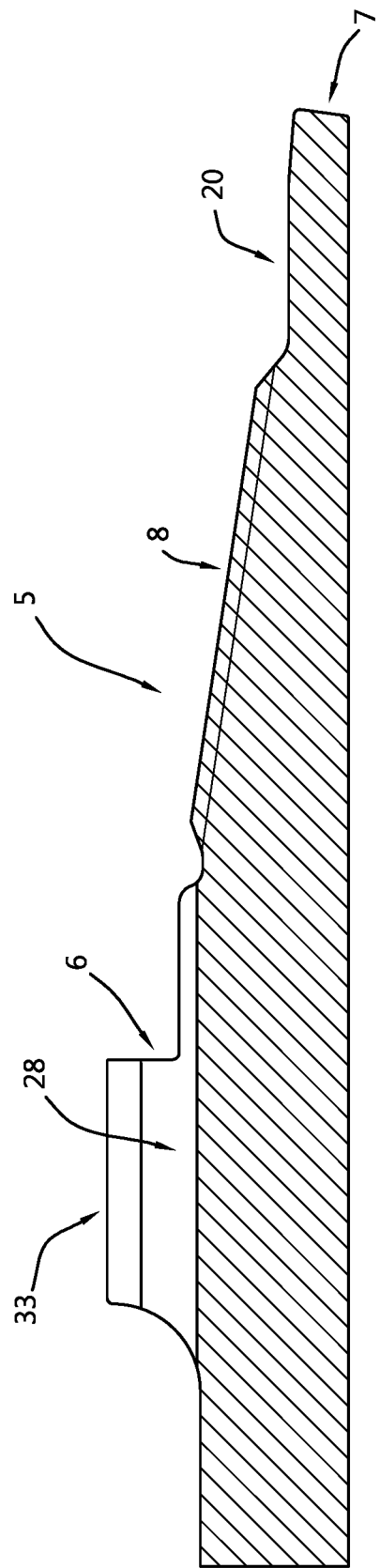
Figure 4C:
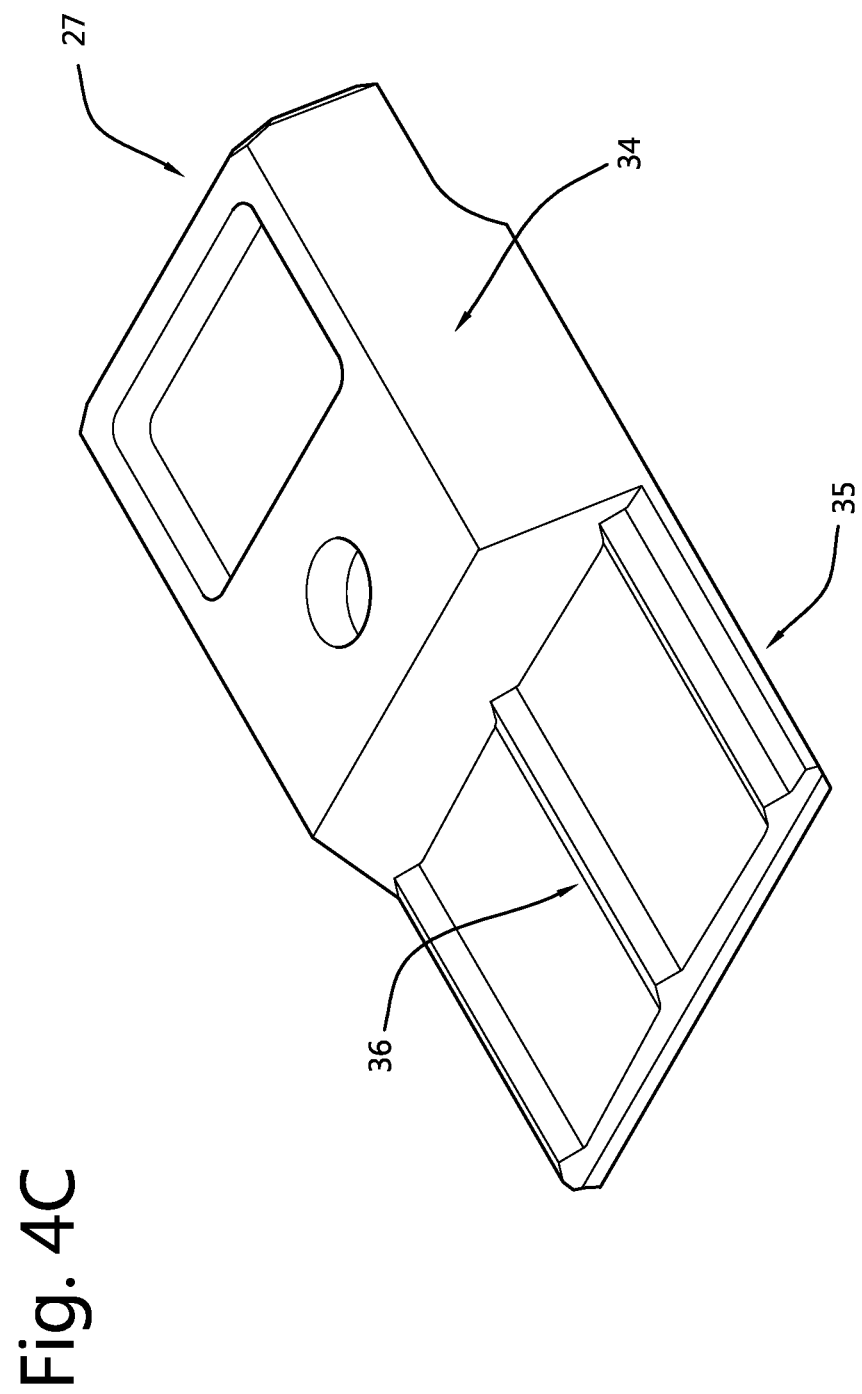
Figure 4D:
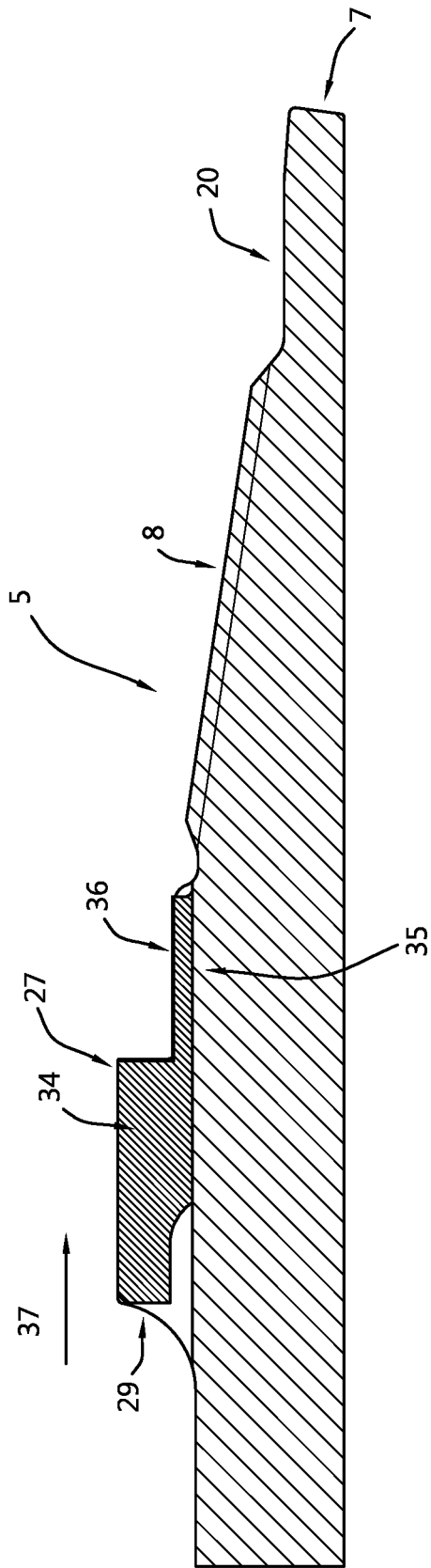

FIG. 4A shows a cross sectional view perpendicular to the central axis of the pin member of FIG. 1A. The cross sectional view of FIG. 1A is along I-I of FIG. 4A. The cross sectional view of FIG. 4B is along IV-IV of FIG. 4A. FIG. 4C shows the anti-rotational key of the pin member of FIG. 1. FIG. 4D show the view of FIG. 4B with the anti-rotational key of FIG. 4C located in the locking position (without the box member).

The threaded connection 1 comprises two anti-rotational keys 27 and two key slots 28 configured to receive the anti-rotational keys 27 in a locking position 29 in which part of the anti-rotational key 27 extends between the pin member 5 and the box member 9 to prevent rotational movement of the pin member 5 and the box member 9 relative to each other at final make-up 16 of the threaded connection 1. This situation is shown in FIG. 4D without the box member 9.

The box member 9 comprises a box lip section 30 extending from the box nose 11 towards the box threaded portion 12 and comprising a box lip inner surface 31 provided with box ribs 32 extending around the central axis 24 (see FIG. 2C).

The at least one anti-rotational key 27 comprise a key body section 34 and a key cutting section 35 (see FIG. 4C). In the locking position 29, the key body section 34 is located in the key slot 28 and the key cutting section 35 is located between the box inner lip surface and the pin member 5. The key cutting section 35 is provided with cutting edges 36 for cutting through the box ribs 32 in a cutting direction 37 37 transverse, preferably perpendicular, to the box ribs 32 during the placing of the respective key in the locking position 29 (see FIG. 4D).

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The terms multiple and plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

It will be apparent to those skilled in the art that various modifications can be made to the shown threaded connection and method according to the invention without departing from the scope as defined in the claims.

The invention claimed is:

1. A threaded connection for hammering interconnected tubular members into a ground that comprises onshore land or offshore seabed for exploration and production of a hydrocarbon well, comprising:
   a pin member comprising an external shoulder, a pin nose, a tapered pin threaded portion located between the external shoulder and the pin nose, and a sealing surface located between the pin nose and the pin threaded portion;
   a box member comprising an internal shoulder, a box nose, a tapered box threaded portion located between the internal shoulder and the box nose, and an elastomeric sealing member located between the internal shoulder and the box threaded portion, where
   the pin threaded portion and the box threaded portion are configured to engage each other during rotational make-up of the threaded connection,
   the pin threaded portion and the box threaded portion comprise hooked threads providing radial interference between at least one of (1) crests of the pin threaded portion and roots of the box threaded portion or (2) crests of the box threaded portion and roots of the pin threaded portion, at final make-up of the threaded connection, wherein the hooked threads comprise a positive stab flank angle and a negative load flank angle,
   facing load flanks of the hooked threads of the pin threaded portion and the box threaded portion are in contact with each other at final make-up of the threaded connection,
   facing stab flanks of the hooked threads of the pin threaded portion and the box threaded portion are located at a flank distance from each other at final make-up of the threaded connection,
   the sealing surface and the elastomeric sealing member are configured to form a radial seal at final make-up of the threaded connection,
   the box nose is in contact with the external shoulder at final make-up of the threaded connection,
   the pin nose is located at a shoulder distance from the internal shoulder at final make-up of the threaded connection, and
   the elastomeric sealing member is spaced apart from the tapered pin threaded portion at final make-up of the threaded connection.

2. The threaded connection of claim 1, wherein the threaded connection defines a central axis.

3. The threaded connection of claim 2, wherein the external shoulder comprises an external contact surface being in contact with a box nose contact surface of the box nose at final make-up, and the external contact surface and the box nose contact surface extend perpendicular to the central axis of the threaded connection.

4. The threaded connection of claim 2, wherein the pin nose and the internal shoulder are configured to be in contact with each other while the facing stab flanks are configured to not be in contact with each other under a predetermined compressive force working on the threaded connection in a direction of the central axis.

5. The threaded connection of claim 2, wherein when seen along the central axis, the facing stab flanks are more spaced from each other than the pin nose and the internal shoulder.

6. The threaded connection of claim 2, wherein the pin and box threaded portions extend under a taper angle (a) between, and including, 6 degrees and 11 degrees relative to the central axis.

7. The threaded connection of claim 2, wherein the internal shoulder comprises an internal stop surface facing a pin nose stop surface of the pin nose and located at the shoulder distance at final make-up, and the internal stop surface and the pin nose stop surface extend under a stop angle of between, and including, 4 degrees and 12 degrees relative to a virtual perpendicular line extending perpendicular to the central axis of the threaded connection.

8. The threaded connection of claim 2, wherein the pin member comprises a pin pipe part having a pin pipe part outer surface located at a pin pipe part outer surface radius (R2) from the central axis and 2 times R2 is between, and including, 508 mm (20 inches) and 1016 mm (40 inches).

9. The threaded connection of claim 2, wherein the box member comprises a box pipe part having a box pipe part outer surface located at a box pipe part outer surface radius (R3) from the central axis and 2 times R3 is between, and including, 508 mm (20 inches) and 1016 mm (40 inches).

10. The threaded connection of claim 2, further comprising at least one anti-rotational key and at least one key slot configured to receive the anti-rotational key in a locking position in which at least part of the anti-rotational key extends between the pin member and the box member to prevent rotational movement of the pin member and the box member relative to each other at final make-up of the threaded connection; and
   wherein:
      the box member comprises a box lip section extending from the box nose towards the box threaded portion and comprising a box lip inner surface provided with box ribs extending around the central axis,
      the pin member comprises a pin member shoulder section which forms the external shoulder,
      the at least one anti-rotational key comprise a key body section and a key cutting section, in the locking position, the key body section is located in the key slot and the key cutting section is located between the box inner lip surface and the pin member, and wherein the key cutting section is provided with cutting edges for cutting through the box ribs in a cutting direction transverse to the box ribs during the placing of the respective key in the locking position.

11. The threaded connection of claim 1, wherein the radial interference between the at least one of (1) crests of the pin threaded portion and roots of the box threaded portion or (2) crests of the box threaded portion and roots of the pin threaded portion at final make-up of the threaded connection is between, and including, 0.05 mm and 0.25 mm.

12. The threaded connection of claim 1, wherein the shoulder distance is larger than 0 mm and smaller than 0.3 mm at final make-up of the threaded connection.

13. The threaded connection of claim 1, wherein the flank distance Is between, and including, 0.1 mm and 0.25 mm at final make-up of the threaded connection.

14. The threaded connection of claim 1, wherein the pin member comprises a pin member inner surface, the box member comprises a box member inner surface.

15. The threaded connection of claim 14, wherein the pin member inner surface and the box member inner surface are both located at an inner member surface radius (RI) from the central axis.

16. The threaded connection of claim 1, wherein the pin member and the box member comprise a single step thread formed by the pin threaded portion and box threaded portion, respectively.

17. The threaded connection of claim 1, wherein the pin threaded portion and the box threaded portion comprise multi threads that are configured to be made-up by rotational make-up over between, and including, 180 degrees and 360 degrees.

18. The threaded connection of claim 1, wherein the threaded connection is configured to reach final make-up when contact between the box nose and the external shoulder is achieved during rotational make-up.

19. The threaded connection of claim 1, wherein the threaded connection is configured to be hammered into the ground after final make-up has been reached and with the pin member positioned on top of the box member during the hammering.

20. The threaded connection of claim 1, wherein the threaded connection is configured to interconnect tubular members having an outer diameter between, and including, 508 mm (20 inches) and 1016 mm (40 inches).

21. A method for hammering interconnected tubular members into a ground, such as onshore land or offshore seabed, for exploration and production of a hydrocarbon well, said tubular members being interconnected via a threaded connection according to claim 1, wherein the method comprises hammering the interconnected tubular members after final make-up of the threaded connection has been reached and with the pin member positioned on top of the box member during the hammering.

22. The threaded connection of claim 1, wherein the entire elastomeric sealing member is located between the internal shoulder and the box threaded portion.

23. A threaded connection for hammering interconnected tubular members into a ground that comprises onshore land or offshore seabed for exploration and production of a hydrocarbon well, comprising:

a pin member comprising an external shoulder, a pin nose, a tapered pin threaded portion located between the external shoulder and the pin nose, and a sealing surface located between the pin nose and the pin threaded portion;

a box member comprising an internal shoulder, a box nose, a tapered box threaded portion located between the internal shoulder and the box nose, and an elastomeric sealing member located between the internal shoulder and the box threaded portion, where the pin threaded portion and the box threaded portion are configured to engage each other during rotational make-up of the threaded connection, the pin threaded portion and the box threaded portion comprise hooked threads providing radial interference between at least one of (1) crests of the pin threaded portion and roots of the box threaded portion or (2) crests of the box threaded portion and roots of the pin threaded portion, at final make-up of the threaded connection, wherein the hooked threads comprise a positive stab flank angle and a negative load flank angle, facing load flanks of the hooked threads of the pin threaded portion and the box threaded portion are in contact with each other at final make-up of the threaded connection, facing stab flanks of the hooked threads of the pin threaded portion and the box threaded portion are located at a flank distance from each other at final make-up of the threaded connection, the sealing surface and the elastomeric sealing member are configured to form a radial seal at final make-up of the threaded connection, the box nose is in contact with the external shoulder at final make-up of the threaded connection, the pin nose is located at a shoulder distance from the internal shoulder at final make-up of the threaded connection, and wherein the threaded connection comprises at least one anti-rotational key and at least one key slot configured to receive the anti-rotational key in a locking position in which at least part of the anti-rotational key extends between the pin member and the box member to prevent rotational movement of the pin member and the box member relative to each other at final make-up of the threaded connection.

24. The threaded connection of claim 23, wherein;

the box member comprises a box lip section extending from the box nose towards the box threaded portion and comprising a box lip inner surface provided with box ribs extending around a central axis of the threaded connection, the pin member comprises a pin member shoulder section which forms the external shoulder, the at least one anti-rotational key comprise a key body section and a key cutting section, in the locking position, the key body section is located in the key slot and the key cutting section is located between the box inner lip surface and the pin member.

25. A threaded connection for hammering interconnected tubular members into a ground that comprises onshore land or offshore seabed for exploration and production of a hydrocarbon well, comprising:

a pin member comprising an external shoulder, a pin nose, a tapered pin threaded portion located between the external shoulder and the pin nose, and a sealing surface located between the pin nose and the pin threaded portion;

a box member comprising an internal shoulder, a box nose, a tapered box threaded portion located between the internal shoulder and the box nose, and an elastomeric sealing member located between the internal shoulder and the box threaded portion, where the pin threaded portion and the box threaded portion are configured to engage each other during rotational make-up of the threaded connection, the pin threaded portion and the box threaded portion comprise hooked threads providing radial interference between at least one of (1) crests of the pin threaded portion and roots of the box threaded portion or (2) crests of the box threaded portion and roots of the pin threaded portion, at final make-up of the threaded connection, wherein the hooked threads comprise a positive stab flank angle and a negative load flank angle, facing load flanks of the hooked threads of the pin threaded portion and the box threaded portion are in contact with each other at final make-up of the threaded connection, facing stab flanks of the hooked threads of the pin threaded portion and the box threaded portion are located at a flank distance from each other at final make-up of the threaded connection, the sealing surface and the elastomeric sealing member are configured to form a radial seal at final make-up of the threaded connection, the box nose is in contact with the external shoulder at final make-up of the threaded connection, and the pin nose is located at a shoulder distance from the internal shoulder at final make-up of the threaded connection, and wherein the threaded connection is at final make-up free from any radial seal provided between the external shoulder and the engaged pin threaded portion and box threaded portion.

26. A threaded connection for hammering interconnected tubular members into a ground that comprises onshore land or offshore seabed for exploration and production of a hydrocarbon well, comprising:
a pin member comprising:
an external shoulder;
a pin nose;
a tapered pin threaded portion located between the external shoulder and the pin nose;
a sealing surface located between the pin nose and the pin threaded portion;
a pin pipe part having a pin pipe part outer surface located at a pin pipe part outer surface radius (R2) from a central axis of the threaded connection;
a pin member shoulder section which forms the external shoulder and is located between the pin pipe part and the pin threaded portion; and
a pin connector part extending from the pin member shoulder section until the pin nose;
a box member comprising:
an internal shoulder;
a box nose;
a tapered box threaded portion located between the internal shoulder and the box nose;
an elastomeric sealing member located between the internal shoulder and the box threaded portion;
a box pipe part having a box pipe part outer surface located at a box pipe part outer surface radius (R3) from the central axis;
a box member shoulder section which forms the internal shoulder and is located between the box pipe part and the box threaded portion; and
a box connector part extending from the box member shoulder section until the box nose;
wherein the pin threaded portion and the box threaded portion are configured to engage each other during rotational make-up of the threaded connection, the pin threaded portion and the box threaded portion comprise hooked threads providing radial interference between at least one of (1) crests of the pin threaded portion and roots of the box threaded portion or (2) crests of the box threaded portion and roots of the pin threaded portion, at final make-up of the threaded connection, wherein the hooked threads comprise a positive stab flank angle and a negative load flank angle, facing load flanks of the hooked threads of the pin threaded portion and the box threaded portion are in contact with each other at final make-up of the threaded connection, facing stab flanks of the hooked threads of the pin threaded portion and the box threaded portion are located at a flank distance from each other at final make-up of the threaded connection, the sealing surface and the elastomeric sealing member are configured to form a radial seal at final make-up of the threaded connection, the box nose is in contact with the external shoulder at final make-up of the threaded connection, the pin nose is located at a shoulder distance from the internal shoulder at final make-up of the threaded connection, at final make-up, the pin connector part and the box connector part define together an outer connector surface located at an outer connector radius (R4) from the central axis, and the outer connector radius (R4) is larger than each of the pin pipe part outer surface radius (R2) and the box pipe part outer surface radius (R3).

27. The threaded connection of claim 26, wherein the outer connector radius (R4) is between, and including, R2+13 mm and R2+19 mm.

28. The threaded connection of claim 26, wherein the outer connector radius (R4) is between, and including, R3+13 mm and R3+19 mm.

29. The threaded connection of claim 26, wherein the pin pipe part outer surface radius (R2) is equal to the box pipe part outer surface radius (R3).

30. The threaded connection of claim 26, wherein;
a pin transition area having a pin transition radius (RS) is located between the pin pipe part outer surface and the outer connector surface,
a box transition area having a box transition radius (R6) is located between the box pipe part outer surface and the outer connector surface, and
the pin transition radius (RS) is larger than the box transition radius (R6).

31. The threaded connection of claim 30, wherein the pin transition radius (RS) is between, and including, 2 times and 5 times larger than the box transition radius (R6).

32. The threaded connection of claim 30, wherein the pin transition radius (RS) is between, and including, 10 mm and 20 mm and the box transition radius (R6) is between, and including, 2 mm and 8 mm.

33. A method of hammering a string of interconnected tubular members into a ground, the method comprising:

forming a threaded connection by causing relative rotation of a pin member and a box member, wherein:
the pin member comprises an external shoulder, a pin nose, a tapered pin threaded portion located between the external shoulder and the pin nose, and a sealing surface located between the pin nose and the pin threaded portion; and
the box member comprises an internal shoulder, a box nose, a tapered box threaded portion located between the internal shoulder and the box nose, and an elastomeric sealing member located between the internal shoulder and the box threaded portion;
the pin threaded portion and the box threaded portion comprise hooked threads with a positive stab flank angle and a negative load flank angle; and
the relative rotation causes the pin threaded portion and the box threaded portion to engage each other;
continuing the relative rotation of the pin member and box member until final make-up of the threaded connection, at which point:
the pin threaded portion and the box threaded portion provide radial interference between at least one of (1) crests of the pin threaded portion and roots of the box threaded portion or (2) crests of the box threaded portion and roots of the pin threaded portion;
facing load flanks of the hooked threads of the pin threaded portion and the box threaded portion are in contact with each other;
facing stab flanks of the hooked threads of the pin threaded portion and the box threaded portion are located at a flank distance from each other;
the sealing surface and the elastomeric sealing member form a radial seal;
the box nose is in contact with the external shoulder;
the pin nose is located at a shoulder distance from the internal shoulder; and
the elastomeric sealing member is spaced apart from the tapered pin threaded portion; and
hammering the threaded connection into the ground.

34. The method of claim 33, wherein the step of continuing the relative rotation of the pin member and box member is continued until the box nose contacts the external shoulder.

35. The method of claim 33, wherein the pin member is positioned on top of the box member during the hammering.

\* \* \* \* \*